Patented Mar. 7, 1933

1,899,986

UNITED STATES PATENT OFFICE

WILLIAM L. RINTELMAN, OF MILWAUKEE, WISCONSIN, ASSIGNOR, BY MESNE ASSIGNMENTS, TO E. I. DU PONT DE NEMOURS & COMPANY, A CORPORATION OF DELAWARE

1,5-DICHLORO-2,6-DIAMINO-ANTHRAQUINONE-3,7-DISULPHONIC ACID AND PROCESS OF PRODUCING SAME

No Drawing.   Application filed April 20, 1931.   Serial No. 531,631.

This invention relates to new and novel intermediates for dyestuffs of the anthraquinone series, and to a process of making the same.

More particularly, this invention relates to the preparation of a new disulphonic acid; namely, 1,5-dichloro-2,6-diamino-anthraquinone-3,7-disulphonic acid and its readily hydrolizable N-substitution derivatives. 1,5-dichloro-2,6-diamino-anthraquinone-3,7 - disulphonic acid is valuable as an intermediate for vat dyestuffs, and possesses certain advantages for this purpose over the corresponding 1,5-dibromo-compound which is known and disclosed in Example 4, German Patent No. 275,299 and also Example 1, German Patent No. 263,395. These advantages are as follows:

(1) My novel 1,5-dichloro compound can be obtained directly in a higher state of purity than the corresponding 1,5-dibromo-compound. This is explained by the fact that in the preparation of the latter compound by bromination of 2,6-diamino-3,7-disulpho-anthraquinone there is a tendency for the bromine to attack the sulpho groups, resulting in the production of various undesirable by-products. The chlorination of the same 2,6,3,7-compound leads predominantly to 1,5-dichloro-2,6-diamino-3,7 - disulpho - an - thraquinone.

(2) In the use of the 1,5-dibromo intermediate for producing other intermediates or dyestuffs, the bromine atoms have a tendency to wander, whereas my novel dichloro-compound is quite stable under similar conditions.

(3) The cost of the dichloro compound is considerably lower than that of the dibromo compound.

It is accordingly an object of this invention to prepare a dyestuff intermediate adapted to similar uses as 1,5-dibromo-2,6-diamino-3,7-disulpho-anthraquinone but excelling thereover by greater initial purity, by higher stability, and by lower cost.

My preferred method of preparing this compound comprises the steps of sulphonating 2,6-diamino-anthraquinone by means of sulphonating agents such as oleum, and then treating the 2,6-diamino-3,7-disulpho compound thus obtained, either directly or after protecting the amino groups with readily hydrolyzable protective groups, with chlorinating agents to produce 1,5-dichloro-2,6-diamino-3,7-disulpho-anthraquinone.

In general, my process comprises the step of chlorinating compounds containing the following residue in their structure:

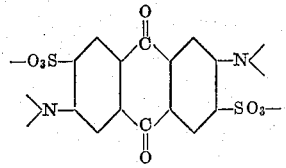

My preferred general process comprises the step of chlorinating a compound of the following general formula:

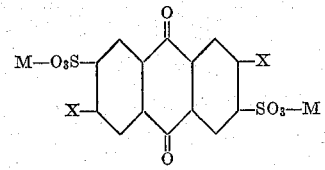

in which X is an amino group either primary or substituted by a readily hydrolyzable protective group, such as an acidyl group, for example an acetyl group, and M is a hydrogen atom or a metallic radical.

Any of the well known chlorinating agents may be used in my process, such as, for example, chlorine gas, potassium chlorate and hydrochloric acid, and the like.

In order to further illustrate my invention, I submit herewith the following specific examples, but it should be understood that my invention is not limited to these examples, as it is susceptible to wide variation as will be readily understood by those skilled in the art.

Example 1

10 parts of 2,6-diamino-anthraquinone are dissolved in 60 parts of 25% oleum at ordinary temperatures. The solution is then heated to 100 to 125° C. for 3 hours while continuously stirring the mass. The mass is then poured into 600 parts of cold water, stirred at room temperature for 4 hours and the precipitate formed is next filtered off and sucked dry.

The resulting filter cake is suspended in 200 parts of cold water and 7 parts of chlorine gas are passed into the suspension over a 6 hour period at ordinary temperatures. 450 parts of 30% hydrochloric acid are then added and the suspension is stirred well. The precipitate is filtered off, the filter cake washed once with 30% hydrochloric acid, and dried at 100° C. until the hydrochloric acid has evaporated. The dried cake is pulverized to a grey-brown powder, which is substantially pure 1,5-dichloro-2,6-diaminoanthraquinone-3,7-disulphonic acid.

This product is insoluble in strong hydrochloric acid, sparingly soluble in concentrated sulphuric acid, dichlorbenzene, nitrobenzene and alcohol, readily soluble to give a yellow amber solution in water, and readily soluble in dilute alkalies. It forms a golden yellow salt on treatment with aniline hydrochloride in aqueous solution. When treated with concentrated sulphuric acid at an elevated temperature it hydrolyzes to give 1,5-dichloro-2,6-diamino-anthraquinone, in substantially pure state, as more fully described and claimed in my copending application, Serial No. 531,632, filed of even date herewith. When treated with acidylating agents, such as acetic anhydride in 10% oleum, it forms the corresponding acidylamino-compound, which is characterized by the property of being readily hydrolyzable to regenerate the free amine, and is therefore useful for the same purpose as the latter.

*Example 2*

The disulpho-diamino compound as obtained in the first paragraph of Example 1 is suspended in 150 parts of cold water and 15 parts of 30% hydrochloric acid are added to the suspension. 6 parts of sodium chlorate are next added and the mass heated slowly to 70° C. for 3 hours. The resulting 1,5-dichloro-2,6-diamino-anthraquinone-3,7-disulphonic acid may be isolated as in Example 1, or if desired, the sodium salt may be precipitated by the addition of common salt.

*Example 3*

10 parts of 2,6-diamino-anthraquinone are dissolved in 100 parts of 25% oleum at ordinary temperatures. The solution is then heated to 105° C. continuously stirred for 3 hours at this temperature and then cooled to about 40° C. 6 parts of glacial acetic acid are next slowly added to the mass at 30 to 40° C. and it is then heated to 100° C., and held at this temperature for 20 minutes. The mass is now cooled to 20–30° C. and poured onto 100 parts of crushed ice, keeping the temperature during this latter procedure below 20° C. The mass now contains 2,6-diacetylamino-anthraquinone-3,7-disulphonic acid. 6 parts of chlorine gas are now passed into the mass over an 8 hour period at ordinary temperatures. The chlorinated mass is now heated at 105° C. for 2 hours to hydrolyze off any of the acetyl groups that may be attached to the amino groups. It is now filtered, washed with 30 parts of 30% hydrochloric acid and dried until the hydrochloric acid is evaporated. The product consists principally of 1,5-dichloro - 2,6 - diamino - anthraquinone - 3,7-disulphonic acid, characterized by the properties as described in Example 1.

I am aware that numerous details of the process may be varied through a wide range without departing from the principles of this invention, and I, therefore, do not purpose limiting the patent granted hereon otherwise than necessitated by the prior art,

I claim as my invention:

1. As a new product of manufacture, a compound of the following general formula:

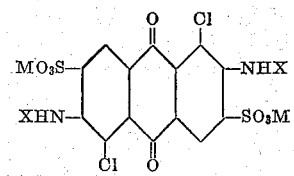

in which X is hydrogen or an acidyl group, and M is a hydrogen atom or a metallic radical.

2. As a new product of manufacture, 1,5-dichloro-2,6-diamino - 3,7 - disulpho-anthra - quinone.

3. In the process of preparing 1,5-dichloro-2,6-diamino-3,7-disulpho-anthraquinone, the step which comprises reacting with a chlorinating agent on a compound of the following general formula:

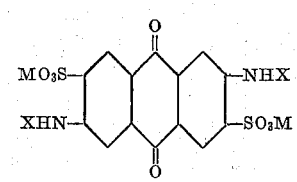

in which X is hydrogen or an acidyl group, and M is a hydrogen atom or a metallic radical.

4. In the process of preparing 1,5-dichloro-2,6-diamino-3,7-disulpho-anthraquinone, the step which comprises reacting with a chlorinating agent upon 2,6-diamino-3,7-disulpho-anthraquinone.

5. The process which comprises reacting on a 2,6-diamino-anthraquinone compound with a sulphonating agent to produce a 2,6-diamino-anthraquinone-3,7-disulphonic acid compound and further reacting upon this compound with a chlorinating agent to produce 1,5 - dichloro -2,6 - diamino-anthraquinone-disulphonic acid.

6. The process which comprises reacting on 2,6-diamino-anthraquinone with a sulphonating agent to produce 2,6-diamino-anthraquinone-3,7-disulphonic acid and further reacting upon this acid with a chlorinating agent to produce 1,5-dichloro-2,6-diamino-anthraquinone-disulphonic acid.

7. As a new product of manufacture, a compound of the following general formula:

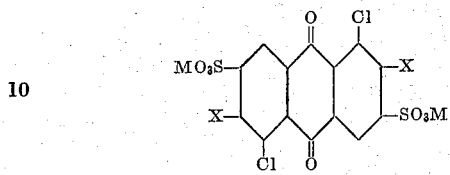

in which X stands for an amino group either primary or substituted by a readily hydrolyzable protective group and M is a hydrogen atom or a metallic radical.

8. In the process of preparing 1,5-dichloro-2,6-diamino-3,7-disulpho-anthraquinone, the step which comprises reacting with a chlorinating agent on a compound of the following general formula:

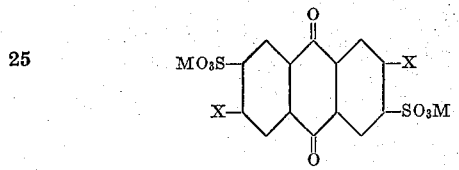

in which X stands for an amino group either primary or substituted by a readily hydrolyzable protective group, and M is a hydrogen atom or a metallic radical.

In testimony whereof I have hereunto subscribed my name at Carrollville, Milwaukee County, Wisconsin.

WILLIAM L. RINTELMAN.